US008145398B2

(12) United States Patent
Landes et al.

(10) Patent No.: US 8,145,398 B2
(45) Date of Patent: Mar. 27, 2012

(54) METHOD FOR CONTROLLING GEAR RATIO CHANGES IN AN AUTOMATIC TRANSMISSION

(75) Inventors: James W. Landes, East Peoria, IL (US); Justin L. Steinlage, Mackinaw, IL (US); David L. Dickrell, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 719 days.

(21) Appl. No.: 12/291,642

(22) Filed: Nov. 12, 2008

(65) Prior Publication Data

US 2010/0121543 A1 May 13, 2010

(51) Int. Cl.
*G06F 7/00* (2006.01)

(52) U.S. Cl. ........................................................ 701/51

(58) Field of Classification Search .................... 701/51, 701/54, 55, 64; 180/65.7

See application file for complete search history.

(56) References Cited

U.S. PATENT DOCUMENTS 5,272,632 A * 12/1993 Noguchi et al. ................ 701/59
5,475,591 A 12/1995 Suzuki et al.
5,526,261 A 6/1996 Kallis et al.
5,669,850 A 9/1997 Dourra et al.
5,738,605 A 4/1998 Fliearman et al.
6,098,004 A 8/2000 Grytzelius et al.
6,123,644 A 9/2000 Janecke et al.
6,220,987 B1 4/2001 Robichaux et al.
6,609,056 B1 8/2003 Czarnecki et al.
6,616,575 B1 9/2003 Lorentz
6,623,403 B2 9/2003 Ishiguro et al.
6,652,418 B1 11/2003 Gutknecht-Stohr et al.
6,782,962 B2 8/2004 Michioka et al.
7,044,887 B2 5/2006 Tanaka et al.
7,549,946 B2 * 6/2009 Ayabe et al. .................. 477/107
2007/0213175 A1 9/2007 Kuwahara et al.
2008/0004159 A1 1/2008 Kubonoya et al.
2008/0070737 A1 3/2008 Shiohara

* cited by examiner

*Primary Examiner* — Kim T Nguyen
(74) *Attorney, Agent, or Firm* — Liell & McNeil

(57) ABSTRACT

A method of controlling an automatic transmission of a machine includes a step of identifying an upcoming gear ratio change from a current gear ratio to a proposed gear ratio. An estimated power output value, based on the proposed gear ratio and a current engine speed, is determined. The estimated power output value is adjusted based on a derated operating condition. If the estimated power output value is greater than or equal to a current power output value, a gear evaluation identifier is set to a first value. If the estimated power output value is less than the current power output value, the gear evaluation identifier is set to a second value.

20 Claims, 4 Drawing Sheets

METHOD FOR CONTROLLING GEAR RATIO CHANGES IN AN AUTOMATIC TRANSMISSION

TECHNICAL FIELD

The present disclosure relates generally to a method for controlling gear ratio changes in an automatic transmission, and more particularly to a method for reducing occurrence of a gear hunting event.

BACKGROUND

Drive systems for machines, including both on-highway and off-highway machines, generally include an internal combustion engine providing power to a transmission, such as an automatic transmission. The transmission is configured to transmit that power, according to a specific gear ratio, to one or more ground engaging elements of the machine. According to a specific example, the drive system may also include a torque converter fluidly coupling the internal combustion engine and the transmission, and one or more axles, differentials, and final drives for transmitting power from the transmission to drive wheels of the machine. In an electronically controlled automatic transmission, an electronic controller may use sensors to detect various operating conditions of the machine, including the internal combustion engine and transmission, in order to control shifting of the transmission gear ratios. Such shifting generally occurs according to predetermined shift points, which may be stored in a memory of the machine. Typically, the shift points are selected to provide a managed change of power as the transmission shifts from one gear ratio to another gear ratio.

Occasionally, a gear hunting, or shift hunting, event may occur, when the transmission selects a new gear ratio and subsequently returns to a previous gear ratio. For example, a gear hunting event may occur due to a loss of machine speed during the shift from the old gear ratio to the new gear ratio, or when there is not enough power to maintain the machine speed in the new gear ratio. To reduce occurrence of such a gear hunting event, an anti-hunt strategy may be employed. For example, U.S. Pat. No. 5,738,605 teaches an anti-hunt strategy for an automatic transmission. Specifically, the control strategy uses learned vehicle inertia, a road load torque, and an expected torque in an upshift gear to determine a projected post shift acceleration. If vehicle speed and throttle position are within an allowable shift zone and if the predicted post shift acceleration exceeds a threshold value, the vehicle automatic transmission is allowed to upshift. Otherwise, the upshift is prevented. It should be appreciated, however, that there remains a continuing need for improved strategies for controlling gear ratio changes in electronically controlled automatic transmissions.

The present disclosure is directed to one or more of the problems set forth above.

SUMMARY OF THE DISCLOSURE

In one aspect, a method of controlling an automatic transmission of a machine includes a step of identifying an upcoming gear ratio change from a current gear ratio to a proposed gear ratio. An estimated power output value, based on the proposed gear ratio and a current engine speed, is determined. The estimated power output value is adjusted based on a derated operating condition. If the estimated power output value is greater than or equal to a current power output value, a gear evaluation identifier is set to a first value. If the estimated power output value is less than the current power output value, the gear evaluation identifier is set to a second value.

In another aspect, a machine includes an electronically controlled automatic transmission having at least two gear ratios, and an internal combustion engine coupled to the electronically controlled automatic transmission. At least one electronic controller is in communication with the electronically controlled automatic transmission and the internal combustion engine. The electronic controller is configured to identify an upcoming gear ratio change from a current gear ratio to a proposed gear ratio. An estimated power output value, based on the proposed gear ratio and a current engine speed, is determined. The electronic controller is also configured to adjust the estimated power output value based on a derated operating condition. If the estimated power output value is greater than or equal to a current power output value, the current gear ratio is changed to the proposed gear ratio. If the estimated power output value is less than the current power output value, the current gear ratio is maintained.

A method of reducing an occurrence of a gear hunting event in an automatic transmission of a machine includes a step of identifying an upcoming gear ratio change from a current gear ratio to a proposed gear ratio based on a predetermined shift point. An estimated power output value, based on the proposed gear ratio and a current engine speed, is determined. The estimated power output value is adjusted based on a derated operating condition. If the estimated power output value is greater than or equal to a current power output value, the current gear ratio is changed to the proposed gear ratio. If the estimated power output value is less than the current power output value, the predetermined shift point is adjusted.

DETAILED DESCRIPTION

Figure 1:
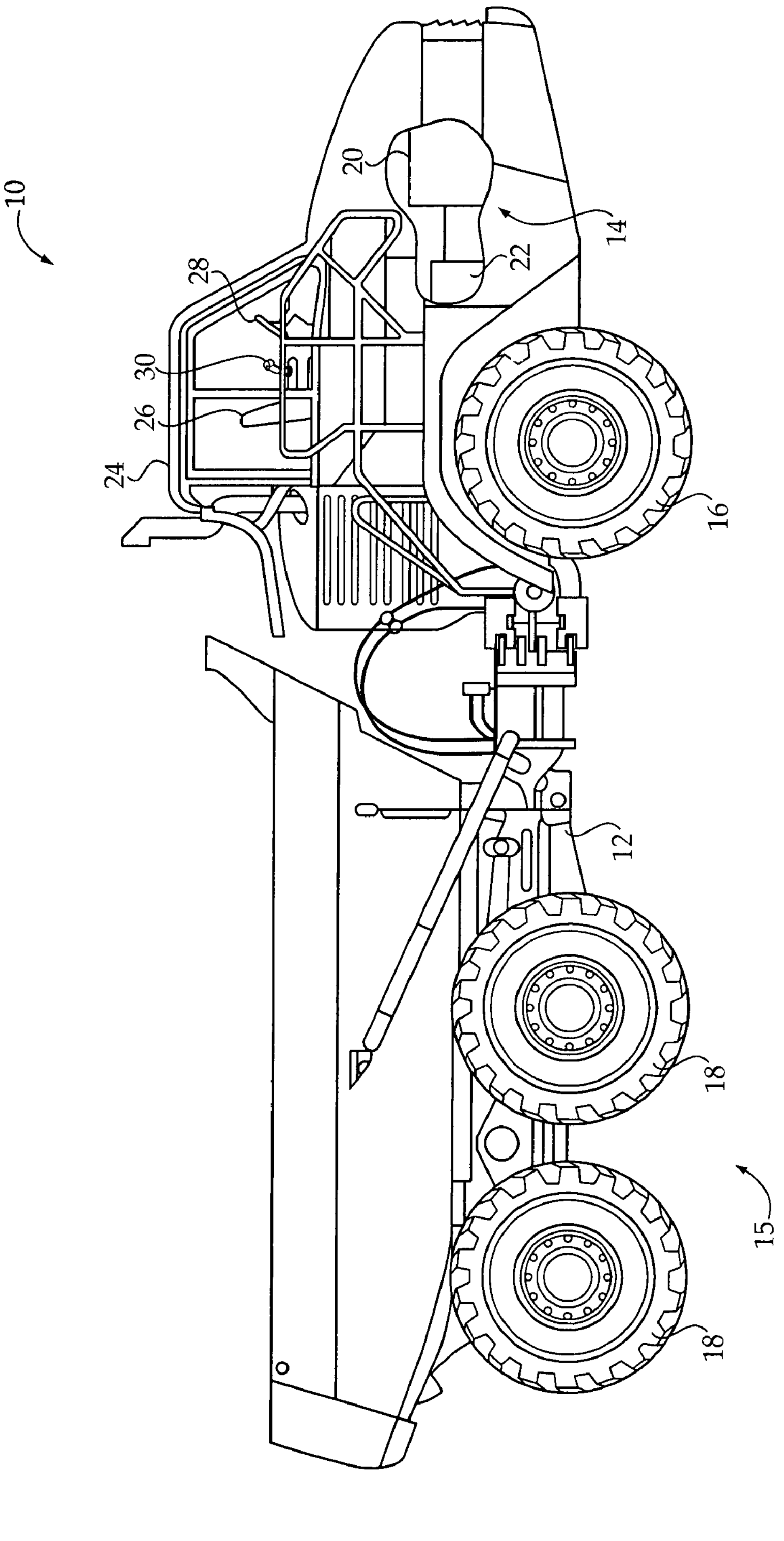
FIG. 1 is a side diagrammatic view of a machine, according to the present disclosure.

An exemplary embodiment of a machine 10 is shown generally in FIG. 1. The machine 10 may be an articulated truck, as shown, or any other on-highway or off-highway vehicle used to perform work operations. In the illustrated embodiment, machine 10 includes a machine body 12 having a drive system 14 supported thereon for driving ground engaging elements 15 of the machine 10, such as, for example, front wheels 16 or rear wheels 18. Drive systems, such as drive system 14, are known and typically include an internal combustion engine 20 configured to transmit power to a transmission, such as an automatic transmission 22. The automatic transmission 22, in turn, may be configured to transmit power to one or more ground engaging elements 15, such as the front wheels 16 or rear wheels 18, using any known means. According to a specific example, the drive system 14 may also include a torque converter fluidly connecting the internal combustion engine 20 and automatic transmission 22, and one or more axles, differentials, and final drives for transmitting power from the automatic transmission 22 to drive wheels, such as wheels 16 and/or 18, of the machine 10. It should be appreciated, however, that a variety of drive systems are contemplated for propelling the machine 10.

An operator control station 24 may be mounted to the machine body 12 and may include known devices, such as, for example, a seat assembly 26 and a steering device 28 that facilitate operator control. The operator control station 24 may include various other devices, including, but not limited to, one or more machine operation controllers 30. For example, a machine operation controller 30 may be provided for controlling movement of an implement of the machine 10. In addition, a machine operation controller 30 may be provided for controlling a direction of movement of the machine 10, such as a forward, neutral, or reverse direction. The operator control station 24 may also include a specific machine operation controller 30, such as a throttle, for selecting an engine speed of the internal combustion engine 20. Additional controls and devices, as should be appreciated, may also be provided within the operator control station 24.

Figure 2:
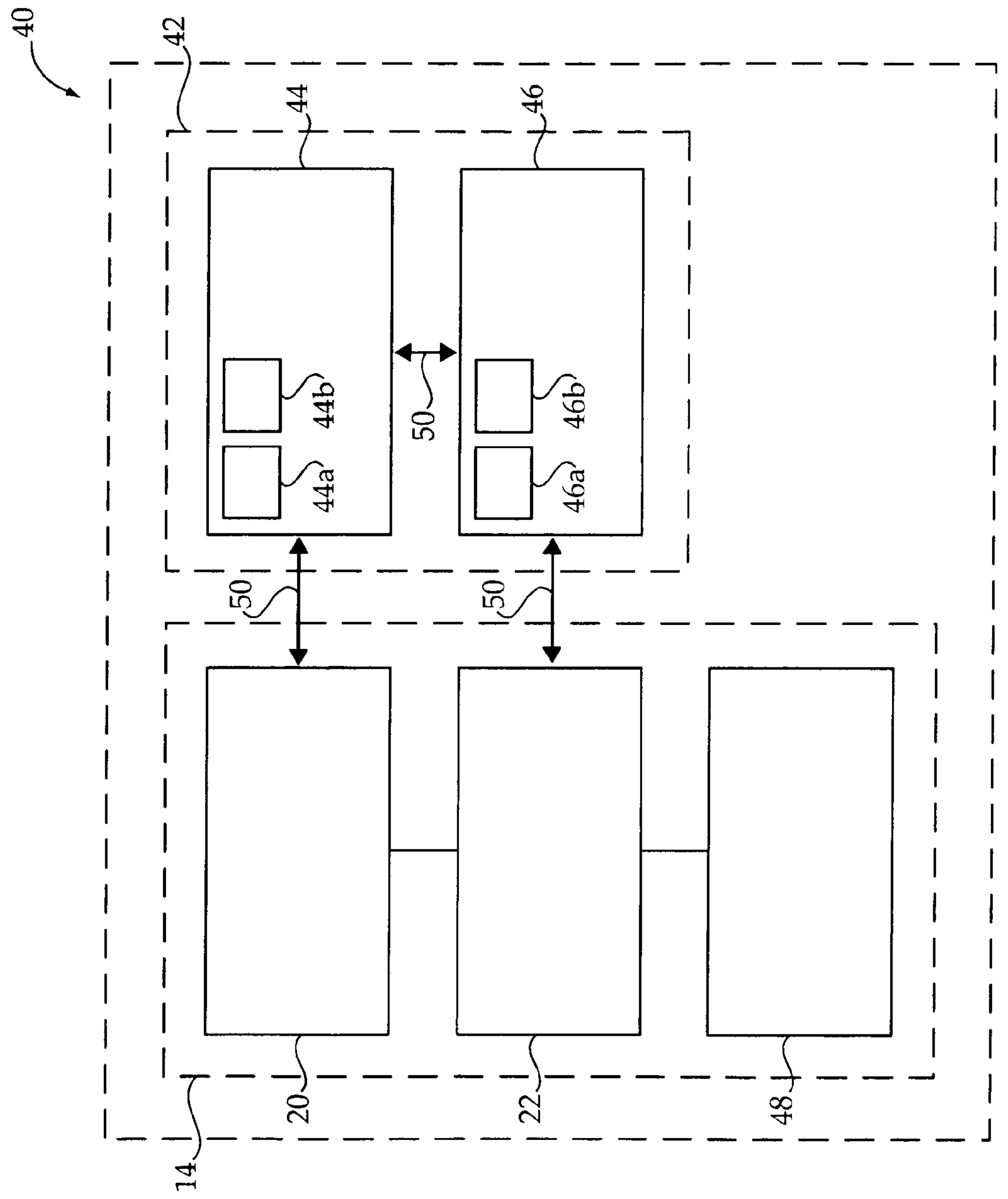
FIG. 2 is a block diagram of an exemplary control system for a machine, such as the machine of FIG. 1, according to the present disclosure.

Turning now to FIG. 2, an exemplary control system for controlling the drive system 14, and other components, of machine 10 is shown generally at 40. Specifically, the control system 40 may include an electronic control system 42 comprising one or more electronic controllers for controlling one or more of the various components or systems of machine 10. For example, the control system 40 may include an engine electronic controller 44 for controlling one or more operational aspects of the internal combustion engine 20, and a transmission electronic controller 46 for controlling operation of the automatic transmission 22 and/or additional components of the drive system 14. According to one embodiment, the transmission electronic controller 46 may also control operation of a final drive assembly 48, or other assembly or component used with the automatic transmission 22 to transmit power from the internal combustion engine 20 to ground engaging elements 15, such as wheels 16 and/or 18. Although two electronic controllers 44 and 46 are shown, it should be appreciated that the electronic control system 42 may include any number of electronic controllers, such as one or more, for controlling any of various operational aspects of machine 10. Further, the electronic control system 42 may include a master electronic controller (not shown) for controlling and/or coordinating operation of the electronic controllers 44 and 46. Alternatively, however, one of the engine electronic controller 44 and the transmission electronic controller 46 may be designated master electronic controller.

Each of the electronic controllers 44 and 46 may be of standard design and may include a processor, such as, for example, a central processing unit, a memory, and an input/output circuit that facilitates communication internal and external to the electronic controllers 44 and 46. According to the illustrated embodiment, for example, electronic controllers 44 and 46 may include processors **44*a* and 46*a*, respectively, and memories 44*b* and 46*b*, respectively. The processors 44*a* and 46*a* may control operation of the electronic controllers 44 and 46 by executing operating instructions, such as, for example, computer readable program code stored in memories 44*b* and 46*b*, wherein operations may be initiated internally or externally to the electronic controllers 44 and 46**. A control scheme may be utilized that monitors outputs of systems or devices, such as, for example, sensors, actuators, or control units, via the input/output circuit to control inputs to various other systems or devices.

The memories **44*b* and 46*b* may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices. Such devices may be located internally or externally to the electronic controllers 44 and 46**. One skilled in the art will appreciate that any computer based system or device utilizing similar components for controlling the machine systems or components described herein, is suitable for use with the present disclosure.

The electronic controllers 44 and 46, and additional electronic controllers of the electronic control system 42, may communicate via one or more wired and/or wireless communications lines 50, or other similar input/output circuits. Further, each electronic controller 44 and 46 may communicate with one or more sensors, or other devices, associated with the specific machine system controlled by the electronic controller. For example, the engine electronic controller 44 may be configured to identify a desired engine speed, based on the position of a throttle, described above, and, in response, set an initial engine speed of the internal combustion engine 20 to correspond to the desired engine speed. According to one embodiment, the engine electronic controller 44 may be in communication with a fuel system, such as via communications lines 50, to control the engine speed of the internal combustion engine 20. Further, an engine speed sensor may be configured to communicate with the engine electronic controller 44, via wired or wireless communications lines 50, to provide an indication to the engine electronic controller 44 of the current speed of the internal combustion engine 20. Additional parameters, such as fuel injection parameters, boost pressure, etc., may be detected to estimate an output power, and/or torque, provided by the internal combustion engine 20. The engine electronic controller 44, as should be appreciated, may communicate with various other sensors and/or devices, as necessary to evaluate and/or control performance of the internal combustion engine 20, or engine system in general.

Similarly, the transmission electronic controller 46 may communicate with one or more sensors or devices of the automatic transmission 22, and/or additional components of the drive system 14. For example, one or more sensors, such as, for example, a drive system torque sensor, may produce a signal over communications lines 50 indicative of the rotational speed or temperature of a torque converter of the drive system 14. According to one embodiment, the rotational speed may be used to determine the ground speed of the machine 10. Alternatively, however, it should be appreciated that various other sensors, such as, for example, a transmission output sensor or ground speed sensor, may be used for measuring the ground speed of the machine 10. The transmission electronic controller 46, as should be appreciated, may be in communication with a variety of sensors, including, for example, pressure, speed, or temperature sensors, to properly evaluate and control operation of the automatic transmission 22.

Various inputs to the transmission electronic controller 46 and/or engine electronic controller 44 may be used to control shifting of the automatic transmission 22. For example, the engine electronic controller 44 may communicate one or more engine signals, such as, for example, an engine speed signal and an engine torque signal, to the transmission electronic controller 46. The transmission electronic controller 46 may use the engine signals, along with input signals from the automatic transmission 22, as inputs to a shift control logic executed thereon to control shifting of the automatic transmission 22, such as according to predetermined shift points. Specifically, the transmission electronic controller 46 may communicate shift signals to the automatic transmission 22, such as via communications lines 50, commanding the automatic transmission 22 to upshift from a lower gear ratio to a higher gear ratio, or downshift from a higher gear ratio to a lower gear ratio. More specifically, according to one embodiment, the transmission electronic controller 46 may communicate with electronically controlled actuators, which may include hydraulic clutches, to engage and/or disengage various gear ratios. As should be appreciated, the automatic transmission 22 may include a number of gear ratios and, in addition, the transmission electronic controller 46 may employ any of a variety of known control strategies for controlling such gear ratio changes.

Figure 3:
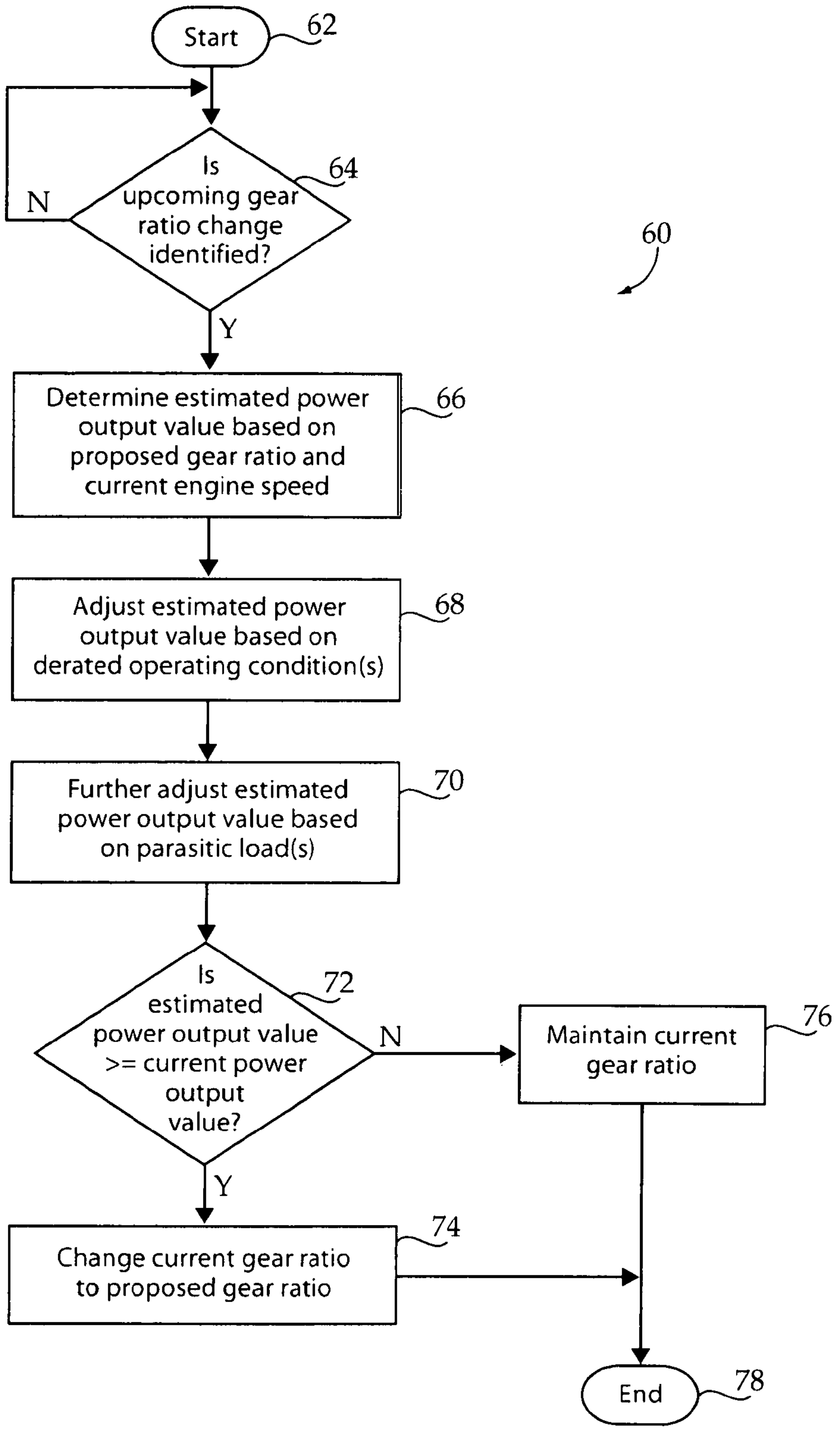
FIG. 3 is a logic flow chart of one embodiment of a method for controlling gear ratio changes in an automatic transmission, as may be implemented by the control system of FIG. 2, according to the present disclosure.

Turning to FIG. 3, there is shown a logic flow diagram 60 representing an exemplary method for controlling gear ratio changes in machine 10, according to the present disclosure. The method may be implemented by the control system 40 or, more specifically, the electronic control system 42 of the machine 10. According to one example, the steps implementing the disclosed method may be in the form of computer readable program code stored in one of the memories 44*b* and 46*b* and executed by the respective processor 44*a* or 46*a* of the engine electronic controller 44 or transmission electronic controller 46, or other computer usable medium. The method may run continuously, as part of the shift control logic for automatic transmission 22, or may be initiated in response to a predetermined event. According to one embodiment, the method may be initiated in response to detection of a derated operating condition, which may result in derated performance of the internal combustion engine 20. It should be appreciated, however, that the method may be initiated in response to various other predetermined conditions of the machine 10.

The method begins at a START, Box 62. From Box 62, the method proceeds to Box 64, which includes the step of determining if an upcoming gear ratio change is identified. Specifically, according to one embodiment, the transmission electronic controller 46 may receive various inputs, as described above, and may identify an upcoming shift from a current gear ratio to a proposed gear ratio, such as according to one or more predetermined shift points stored in memory 46*b*. According to a specific example, the shift points may represent a plurality of desirable shift points, as determined by a manufacturer of the machine 10. Such shift points, as should be appreciated, may identify a desirable upshift from a lower gear ratio to a higher gear ratio, or a downshift from a higher gear ratio to a lower gear ratio. According to the exemplary embodiment, for example, it may be desirable to identify an upcoming upshift from a lower gear ratio to a higher gear ratio. If an upcoming gear ratio change, such as an upshift, is identified, the method proceeds to Box 66. Otherwise, the method may continuously monitor, or standby, for such an identified condition.

Figure 4:
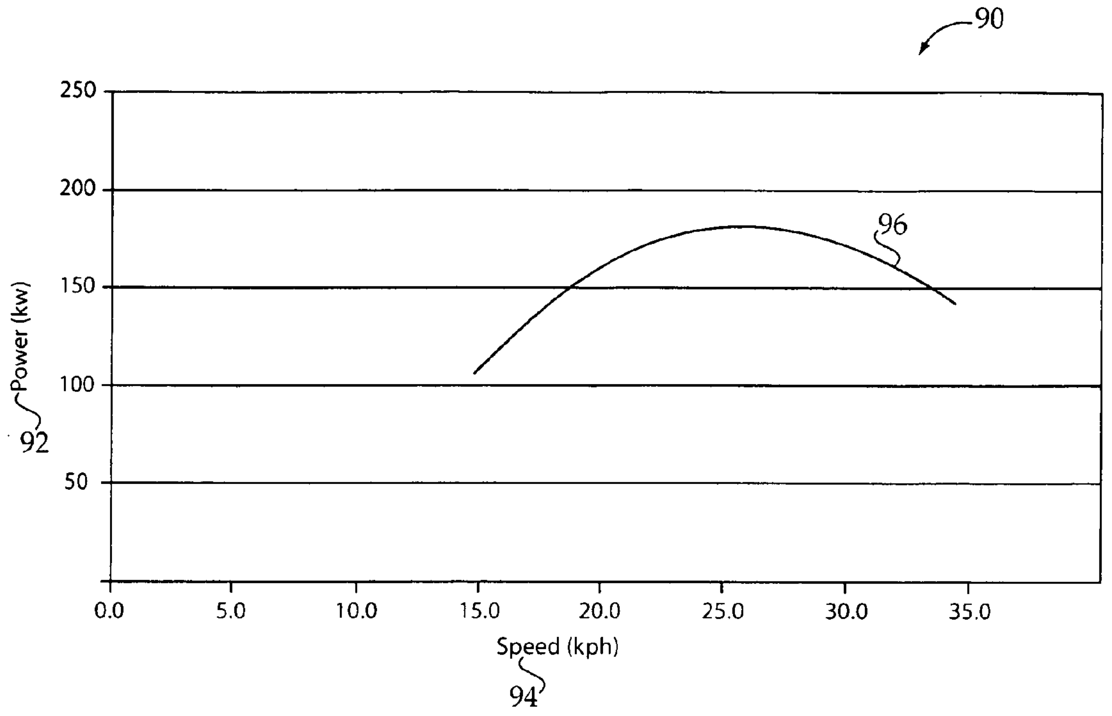
FIG. 4 is a graph of power versus speed illustrating an engine lug curve for an exemplary gear ratio of the machine of FIG. 1, as may be provided by a manufacturer.

When an upcoming gear ratio change, such as an upcoming upshift, is identified by the transmission electronic controller 46, the method may proceed to Box 66. At Box 66, an estimated power output value based on the proposed gear ratio and a current engine speed is determined. According to a specific example, the transmission electronic controller 46 may identify an upcoming upshift from a first, or lower, gear ratio to a second, or higher, gear ratio. In response to the identification, the transmission electronic controller 46 may communicate an identification of the proposed gear ratio and the current engine speed, such as identified by an engine speed sensor, to the engine electronic controller 44, and request the estimated power output value. The engine electronic controller 44 may, according to one example, select the estimated power output value from a lug curve, or engine lug curve, stored in memory 44*b*, which corresponds to the proposed gear ratio and the current engine speed. For example, FIG. 4 illustrates a graph 90 of power, such as rimpower, 92, shown on the vertical axis, versus speed, such as machine speed, 94, shown on the horizontal axis. Depicted on the graph 90 is a nominal lug curve 96 that may represent rated power output values for the proposed gear ratio, as provided by a manufacturer.

Next, at Box 68 of FIG. 3, the engine electronic controller 44 may adjust the estimated power output value based on one or more derated operating conditions, such as, for example, low oil pressure, low fuel pressure, low boost pressure, or operation at a high altitude or high ambient temperature. The derated operating condition, which may be identified by the engine electronic controller 44, transmission electronic controller 46, or other electronic controller or system, may reflect an identification of one or more of various operating states of the machine 10, or operating environment, that may alter performance of the internal combustion engine 20. For example, an increased altitude, as detected by a barometric pressure sensor, or an increased ambient temperature, as detected by a temperature sensor, may negatively impact performance of the internal combustion engine 20, thus preventing the internal combustion engine 20 from operating according to the nominal lug curve 96, shown in FIG. 4. Therefore, the engine electronic controller 44 may reduce the estimated power output value, such as by a set value or by a predetermined percentage, in accordance with the identified derated operating condition. According to a specific embodiment, the engine electronic controller 44 may select an adjustment value or percentage from memory 44*b*, which corresponds to the derated operating condition. According to yet another embodiment, the engine electronic controller 44 may select an adjustment value or percentage from memory 44*b* that corresponds to a specific level or value, such as a specific altitude value, corresponding to the derated operating condition. Such adjustment values or percentages, for example, may be determined based on an evaluation of historical performance data.

In addition, at Box 70, the engine electronic controller 44 may further adjust the estimated power output value based on one or more parasitic loads of machine 10. For example, the engine electronic controller 44 may adjust the estimated power output value based on a cooling fan load, or an implement pump load, corresponding to the current engine speed, which may be selected from memory 44*b*. According to an alternative example, the parasitic loads may be estimated for machine 10, and the estimation may be used to further adjust the estimated power output value. As should be appreciated, such parasitic loads, and/or power losses, such as transmission losses, may reduce the amount of power available at wheels 16 and/or 18 of machine 10 and, as a result, may impact the shifting of gear ratios of the machine 10. The adjusted estimated power output value, which may more accurately reflect the amount of power that will be available in the proposed gear ratio in light of the current operating conditions, may be communicated to the transmission electronic controller 46 from the engine electronic controller 44.

The transmission electronic controller 46 may determine if the estimated power output value is greater than or equal to a current power output value, at Box 72. The current power output value, according to one embodiment, may be estimated by the engine electronic controller 44, such as by using various input values, including, for example, engine speed, fuel injection parameters, boost pressure, etc. Alternatively, however, the current power output value may be measured using a torque measurement device, or other similar device or sensor. In response, a gear evaluation identifier, or flag, may be set to a first value, such as "1," if the estimated power output value is greater than or equal to the current power output value, or a second value, such as "0," if the estimated power output value is less than the current power output value. It should be appreciated that, although a specific example is provided, any preferable means of indicating whether or not the estimated power output value is greater than, or equal to, the current power output value may be used. This indication may then be used by the electronic control system 42 in a number of ways.

For example, if the estimated power output value is greater than or equal to the current power output value, the transmission electronic controller 46 may initiate a change of the current, or lower, gear ratio to the proposed, or higher, gear ratio, according to any of conventional means, at Box 74. Otherwise, if the estimated power output value is less than the current power output value, the transmission electronic controller 46 may maintain the current gear ratio, at Box 76. According to a specific embodiment, the transmission electronic controller 46 may delay the gear ratio change for a predetermined period of time, or until the estimated power output value is greater than or equal to the current power output value. Effectively, as should be appreciated, the transmission electronic controller 46 may adjust the predetermined shift point, upon which the upcoming gear ratio change was based. After the gear ratio change, at Box 74, or the step of maintaining the current gear ratio, at Box 76, the method may proceed to an END, at Box 78.

It should be appreciated that any of the steps of the method described herein may be implemented by either or both of the engine electronic controller 44 and the transmission electronic controller 46, or any other electronic controller. In addition, the method may be used to control gear ratio changes in a machine, such as machine 10, operating subject to any of a variety of derated operating conditions, such as, for example, increased altitude, increased ambient temperature, low boost pressure, low oil pressure, low fuel pressure, etc., as may be sensed or detected by components of the machine 10. Therefore, the estimated power output value, determined at Box 66, may be adjusted, at Box 68 and Box 70, to take into account any condition that may negatively impact performance of the internal combustion engine 20, and, further, may be adjusted in any useful way. For example, the estimated power output value may be scaled by set values or percentages that have been determined according to any of a number of calculations. As a result, the shift points of the machine 10, as described above, may be effectively adjusted to account for the current operating conditions and/or performance of the internal combustion engine 20.

Industrial Applicability

The present disclosure may find potential application in any on-highway or off-highway machine designed to perform work operations. Further, the present disclosure may be applicable to machines having electronically controlled automatic transmissions. Yet further, the present disclosure may apply to machines that may operate subject to one or more derated operating conditions, such as, for example, low oil pressure, low fuel pressure, low boost pressure, or operation at a high altitude or high ambient temperature. Such machines may include, but are not limited to, off-highway machines, such as articulated trucks or wheel tractor scrapers, on-highway machines, such as buses and trucks, stationary applications, and other machines known in the art.

Referring generally to FIGS. 1-5, a machine 10 may include a machine body 12 having a drive system 14 supported thereon for driving wheels of the machine 10, such as, for example, front wheels 16 or rear wheels 18. Drive systems, such as drive system 14, are known and typically include an internal combustion engine 20 configured to transmit power to a transmission, such as an automatic transmission 22. The automatic transmission 22, in turn, may be configured to transmit power to one or more ground engaging elements 15, such as the front wheels 16 or rear wheels 18, using any known means. A control system 40 for machine 10 may include an electronic control system 42 comprising one or more electronic controllers, such as an engine electronic controller 44 and a transmission electronic controller 46, for controlling various operational aspects of the machine 10.

During operation of the machine 10, shift control logic, which may be stored and executed on the transmission electronic controller 46, or other controller, may control gear ratio changes of the automatic transmission 22. According to one example, the engine electronic controller 44 may communicate one or more engine signals, such as, for example, an engine speed signal and an engine torque signal, to the transmission electronic controller 46. The transmission electronic controller 46 may use the engine signals, along with input signals from the automatic transmission 22, as inputs to the shift control logic executed thereon to control shifting of the automatic transmission 22, such as according to predetermined shift points. Typically, such shift points are selected based on normal operating conditions of the internal combustion engine 20, during which the internal combustion engine 20 may produce about the amount of power, or torque, specified by the manufacturers of the machine 10. However, certain operating conditions, such as the derated operating conditions described above, may impact performance of the internal combustion engine 20. As a result, shifting, according to the predetermined shift points, may lead to a gear hunting event, if the internal combustion engine 20 is not able to provide enough power to maintain the machine speed in the new gear ratio.

Figure 5:
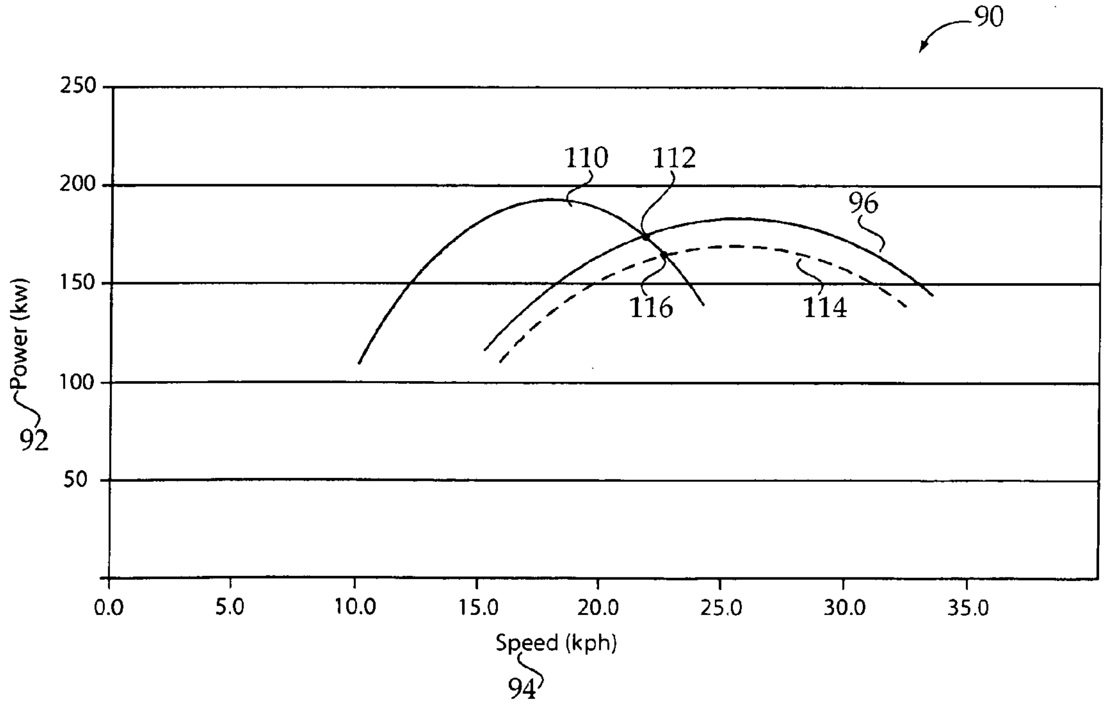
FIG. 5 is a graph of power versus speed illustrating a predetermined shift point for shifting between two gear ratios of the machine of FIG. 1 and an adjusted shift point, as may be effectively determined by the control strategy described herein.

For example, as shown in FIG. 5, a lug curve 110 may represent rated power output values for the current gear ratio, while lug curve 96 represents rated power output values for the proposed gear ratio, both of which may be provided by a manufacturer. A predetermined shift point 112 may have been previously identified at a crossover point of the lug curves 110 and 96 to provide a managed change of power as the automatic transmission 22 shifts from the current gear ratio to the proposed gear ratio. However, if the internal combustion engine 20 is operating subject to one or more derated operating conditions, the engine 20 may not be able to produce the rated power depicted by lug curve 96. For example, as a result of one of the derated operating conditions described above, the internal combustion engine 20 may only be capable of providing the power output depicted by a derated lug curve 114. As a result, the automatic transmission 22 may shift to the proposed gear ratio and subsequently return to the previous gear ratio.

Utilizing the control system 40 and method of operation described herein may help reduce occurrences of such a gear hunting event. Specifically, when an upcoming gear ratio change, such as an upcoming upshift from a current gear ratio to a proposed gear ratio, is identified, the transmission electronic controller 46 may request an estimated power output value. Specifically, the transmission electronic controller 46 may send an identification of the proposed gear ratio and the current engine speed, such as identified by an engine speed sensor, to the engine electronic controller 44, and request the estimated power output value. The engine electronic controller 44 may, according to one example, select the estimated power output value from a lug curve, such as lug curve 96 of graph 90, which corresponds to the proposed gear ratio and the current engine speed.

The engine electronic controller 44 may then adjust the estimated power output value based on one or more derated operating conditions, such as, for example, increased altitude, increased ambient temperature, low boost pressure, low oil pressure, low fuel pressure, etc. Specifically, the engine electronic controller 44 may reduce the estimated power output value by a set value or by a predetermined percentage, in accordance with the identified derated operating condition. The estimated power output value may be further adjusted based on one or more parasitic loads of machine 10, as described above. The resulting estimated power output value, as adjusted, may be communicated to the transmission electronic controller 46 from the engine electronic controller 44. If the estimated power output value is greater than or equal to a current power output value, the transmission electronic controller 46 may initiate a change of the current gear ratio to the proposed gear ratio, according to any of conventional means. Otherwise, if the estimated power output value is less than the current power output value, the transmission electronic controller 46 may maintain the current gear ratio. Effectively, the transmission electronic controller 46 may adjust the shift point 112, such as to a derated shift point 116, in response to the current performance of the internal combustion engine 20.

It should be appreciated that the control system 40 and method of the present disclosure may provide an improved strategy for controlling gear ratio changes in electronically controlled automatic transmissions, such as automatic transmission 22. Specifically, the disclosed system 40 and method may provide a means for reducing occurrence of a gear hunting event while the machine 10 is operating subject to one or more derated operating conditions, which may negatively impact performance of the internal combustion engine 20. Effectively, the control strategy may dynamically adjust the predetermined shift points, based on current performance of the internal combustion engine 20, by performing gear ratio changes only when the estimated power output value in the proposed gear ratio is greater than or equal to the current power output value in the current gear ratio.

What is claimed is:

1. A non-transitory computer usable storage medium having computer readable program code thereon for controlling an automatic transmission of a machine, comprising:

computer readable program code for identifying an upcoming gear ratio change from a current gear ratio to a proposed gear ratio;

computer readable program code for determining an estimated power output value based on the proposed gear ratio and a current engine speed;

computer readable program code for adjusting the estimated power output value based on a derated operating condition;

computer readable program code for setting a gear evaluation identifier to a first value if the estimated power output value is greater than or equal to a current power output value; and computer readable program code for setting the gear evaluation identifier to a second value if the estimated power output value is less than the current power output value.

2. The non-transitory computer usable storage medium of claim 1, further including:

computer readable program code for changing the current gear ratio to the proposed gear ratio if the gear evaluation identifier is the first value; and computer readable program code for maintaining the current gear ratio if the gear evaluation identifier is the second value.

3. The non-transitory computer usable storage medium of claim 1, wherein identifying the upcoming gear ratio change includes identifying an upcoming upshift from a lower gear ratio to a higher gear ratio.

4. The non-transitory computer usable storage medium of claim 1, wherein determining the estimated power output value includes communicating a request for the estimated power output value from a transmission electronic controller to an engine electronic controller.

5. The non-transitory computer usable storage medium of claim 4, wherein determining the estimated power output value further includes selecting the estimated power output value corresponding to the proposed gear ratio and the current engine speed from a lug curve stored in a memory.

6. The non-transitory computer usable storage medium of claim 4, wherein adjusting the estimated power output value includes adjusting the estimated power output value by a value corresponding to the derated operating condition.

7. The non-transitory computer usable storage medium of claim 6, wherein adjusting the estimated power output value further includes adjusting the estimated power output value based on at least one parasitic load.

8. The non-transitory computer usable storage medium of claim 6, further including computer readable program code for communicating the estimated power output value from the engine electronic controller to the transmission electronic controller after the adjusting step.

9. The non-transitory computer usable storage medium of claim 1, wherein determining the estimated power output value, adjusting the estimated power output value, and setting the gear ratio identifier to the first value or second value are performed only if the derated operating condition is detected.

10. A machine, comprising:

an electronically controlled automatic transmission having at least two gear ratios;

an internal combustion engine coupled to the electronically controlled automatic transmission; and at least one electronic controller in communication with the electronically controlled automatic transmission and the internal combustion engine, wherein the at least one electronic controller is configured to identify an upcoming gear ratio change from a current gear ratio to a proposed gear ratio; determine an estimated power output value based on the proposed gear ratio and a current engine speed; adjust the estimated power output value based on a derated operating condition; change the current gear ratio to the proposed gear ratio if the estimated power output value is greater than or equal to a current power output value; and maintain the current gear ratio if the estimated power output value is less than the current power output value.

11. The machine of claim 10, wherein the upcoming gear ratio change includes an upshift from a lower gear ratio to a higher gear ratio.

12. The machine of claim 11, further including an engine electronic controller and a transmission electronic controller, wherein the transmission electronic controller is configured to communicate a request for the estimated power output value to the engine electronic controller.

13. The machine of claim 12, wherein the engine electronic controller is configured to select the estimated power output value corresponding to the proposed gear ratio and the current engine speed from a lug curve stored in a memory.

14. The machine of claim 12, wherein the engine electronic controller is configured to adjust the estimated power output value by a value corresponding to the derated operating condition.

15. The machine of claim 14, wherein the engine electronic controller is further configured to adjust the estimated power output value based on at least one parasitic load corresponding to the current engine speed.

16. The machine of claim 14, wherein the engine electronic controller is further configured to communicate the estimated power output value to the transmission electronic controller.

17. The machine of claim 16, wherein the transmission electronic controller is further configured to delay the upshift if the estimated power output value is less than the current power output value.

18. A non-transitory computer usable storage medium having computer readable program code thereon for reducing an occurrence of a gear hunting event in an automatic transmission of a machine, comprising:

computer readable program code for identifying an upcoming gear ratio change from a current gear ratio to a proposed gear ratio based on a predetermined shift point;

computer readable program code for determining an estimated power output value based on the proposed gear ratio and a current engine speed;

computer readable program code for adjusting the estimated power output value based on a derated operating condition;

computer readable program code for changing the current gear ratio to the proposed gear ratio if the estimated power output value is greater than or equal to a current power output value; and computer readable program code for adjusting the predetermined shift point if the estimated power output value is less than the current power output value.

19. The non-transitory computer usable storage medium of claim 18, wherein adjusting the predetermined shift point includes maintaining the current gear ratio.

20. The non-transitory computer usable storage medium of claim 19, further including computer readable program code for delaying the upcoming gear ratio change until the estimated power output value is greater than or equal to the current power output value.

* * * * *

UNITED STATES PATENT AND TRADEMARK OFFICE

CERTIFICATE OF CORRECTION

PATENT NO. : 8,145,398 B2
APPLICATION NO. : 12/291642
DATED : March 27, 2012
INVENTOR(S) : Landes et al.

It is certified that error appears in the above-identified patent and that said Letters Patent is hereby corrected as shown below:

In the Specification

Column 7, line 60, delete “Industrial Applicability” and insert -- INDUSTRIAL APPLICABILITY --.

Signed and Sealed this
Eighteenth Day of August, 2015

Michelle K. Lee

Michelle K. Lee
*Director of the United States Patent and Trademark Office*